(12) United States Patent
Farrington et al.

(10) Patent No.: US 7,816,050 B2
(45) Date of Patent: Oct. 19, 2010

(54) UNIT CELL HEADER FLOW ENHANCEMENT

(75) Inventors: Simon Farrington, Vancouver (CA); Ryan N. Mackie, Vancouver (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 916 days.

(21) Appl. No.: 11/675,862

(22) Filed: Feb. 16, 2007

(65) Prior Publication Data

US 2008/0199750 A1    Aug. 21, 2008

(51) Int. Cl.
*H01M 8/24* (2006.01)
*H01M 8/04* (2006.01)

(52) U.S. Cl. .................. 429/459; 429/514

(58) Field of Classification Search ............ 429/39
See application file for complete search history.

(56) References Cited

U.S. PATENT DOCUMENTS

| | | |
|---|---|---|
| 6,329,094 B1 | 12/2001 | Yasuo et al. |
| 6,818,165 B2 | 11/2004 | Gallagher |
| 6,878,477 B2 | 4/2005 | Frank et al. |
| 6,984,466 B2 | 1/2006 | Haltiner, Jr. et al. |
| 7,094,311 B2 * | 8/2006 | Mercuri .................. 156/307.1 |
| 7,285,352 B2 * | 10/2007 | Yoshimoto et al. ............ 429/38 |
| 2004/0214062 A1 | 10/2004 | Tajiri et al. |
| 2005/0266295 A1 | 12/2005 | Takai |
| 2006/0210855 A1 | 9/2006 | Frank et al. |

FOREIGN PATENT DOCUMENTS

| | | |
|---|---|---|
| DE | 102 57 548 A1 | 7/2004 |
| DE | 102 57 548 * | 8/2004 |
| WO | WO 02/097908 A2 | 12/2002 |
| WO | WO 02/097908 A3 | 12/2002 |

OTHER PUBLICATIONS

International Search Report dated May 28, 2008 (Two (2) pages).

* cited by examiner

*Primary Examiner*—Patrick Ryan
*Assistant Examiner*—Thomas H. Parsons
(74) *Attorney, Agent, or Firm*—Crowell & Moring LLP (57) ABSTRACT

A fluid flow field plate for an electrochemical fuel cell that includes a planar body having a first surface, a second surface. More than one header opening extends between the first surface and the second surface to define a flowpath. At least one open flow field channel with an inlet port and an outlet port is provided in the first surface. Each outlet port is in fluid communication with one of the one header openings. At least one of the outlet port or the inlet port has a baffle extending into the flow path.

17 Claims, 8 Drawing Sheets

*Prior Art*

UNIT CELL HEADER FLOW ENHANCEMENT

BACKGROUND OF THE INVENTION

1. Field of the Invention

The present invention relates to fuel cells, and particularly to enhancing the flow for unit cell headers of fuel cells.

2. Description of the Related Art

Fuel cell systems are currently being developed for numerous applications, such as automobiles and stationary power plants, where they will be used to economically deliver power with significant environmental benefits.

Preferred fuel cell types include solid polymer fuel cells that comprise a solid polymer electrolyte, otherwise referred to as an ion exchange membrane, and operate at relatively low temperatures. The membrane is disposed between two electrodes, namely a cathode and an anode, forming a membrane electrode assembly ("MEA"). Each electrode contains a catalyst layer, comprising an appropriate catalyst, located next to the solid polymer electrolyte. The catalyst induces the desired electrochemical reactions at the electrodes. During normal operation of a solid polymer electrolyte fuel cell, fuel is electrochemically oxidized at the anode catalyst, typically resulting in the generation of protons, electrons, and possibly other species depending on the fuel employed. The protons are conducted from the reaction sites at which they are generated, through the electrolyte, to electrochemically react with the oxidant at the cathode catalyst. The electrons pass through an external circuit, creating a flow of electricity.

The MEA is typically disposed between two plates to form a fuel cell assembly. The plates act as current collectors and provide support for the adjacent electrodes. The assembly is typically compressed to ensure good electrical contact between the plates and the electrodes, in addition to good sealing between fuel cell components.

A plurality of fuel cell assemblies may be combined in series or in parallel to form a fuel cell stack. In a fuel cell stack, a plate may be shared between adjacent fuel cell assemblies, in which case the plate also serves as a separator to fluidly isolate the fluid streams of the two adjacent fuel cell assemblies.

In a fuel cell, these plates on either side of the MEA may incorporate flow fields for the purpose of directing reactants across the surfaces of the fluid diffusion electrodes or electrode substrates. The flow fields include fluid distribution channels separated by landings. The channels provide passages for the distribution of reactant to the electrode surfaces and also for the removal of reaction products and depleted reactant streams. The landings act as mechanical supports for the fluid diffusion layers in the MEA and provide electrical contact thereto.

In the assembled stack, the aligned fluid header openings form internal manifolds or headers for the supply and exhaust of reactants to the channels in the fluid flow field plates. The fluid reactant streams are supplied to and exhausted from the headers via oxidant inlet and outlet ports and respectively, and fuel inlet and outlet ports.

In a stack, high velocity flow from the fuel cells enters the header outlet at right angles to the direction of header flow. As the high velocity flow impinges onto the main flow, it reduces the amount of cross-sectional area through which the main flow can travel in the header direction.

Furthermore, a "crescent moon" of product water has a tendency to form between the plate pinch cuts in the port area. There is a propensity for this water formation to be sucked back into the small ducts between the port and transition region by capillary action following a purge event. This water has been shown to subsequently cause blockage in these areas restricting flow to the cell.

Previously, the size of the header openings would have been adjusted in response to any cell-to-cell flow sharing problems. For example, U.S. Pat. No. 6,984,466 proposes widthwise uniformity of flow across the anodes and cathodes is improved by forming each of the header openings into a plurality of smaller, parallel flow passages. The shortcoming of this solution is that simply resizing the header flow area does not necessarily increase its utilization or reduce the wasted space caused by this effect.

Accordingly, although there have been advances in the field, it would be desirable to enhance the main flow for the unit cell headers of fuel cells.

BRIEF SUMMARY OF THE INVENTION

According to the present invention there is provided a fluid flow field plate for an electrochemical fuel cell. The fluid flow field plate has a planar body with a first surface, a second surface and more than one header opening extending between the first surface and the second surface to define a flowpath. At least one open flow field channel with an inlet port and an outlet port is provided in the first surface. The outlet port is in fluid communication with one of the header openings. At least one of the outlet port or the inlet port has a baffle which extends into the flow path.

DETAILED DESCRIPTION OF THE INVENTION

In the following description, certain specific details are set forth in order to provide a thorough understanding of the various embodiments of the invention. However, one skilled in the art will understand that the invention may be practiced without these details. In other instances, well-known structures associated with fuel cells, fuel cell stacks, and fuel cell systems have not been shown or described in detail to avoid unnecessarily obscuring the description of the embodiment of the invention.

Unless the context requires otherwise, throughout the specification and claims which follow, the work "comprise" and variations thereof, such as, "comprises" and "comprising" are to be construed in an open, inclusive sense, that is as "including, but not limited to".

Reference throughout this specification to "one embodiment" or "an embodiment" means that a particular feature, structure or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features structures, or characteristics, may be combined in a suitable manner in one or more embodiments.

The preferred embodiment of unit cell with header flow enhancement will now be described with reference to FIGS. 1 through 20.

Figure 1:
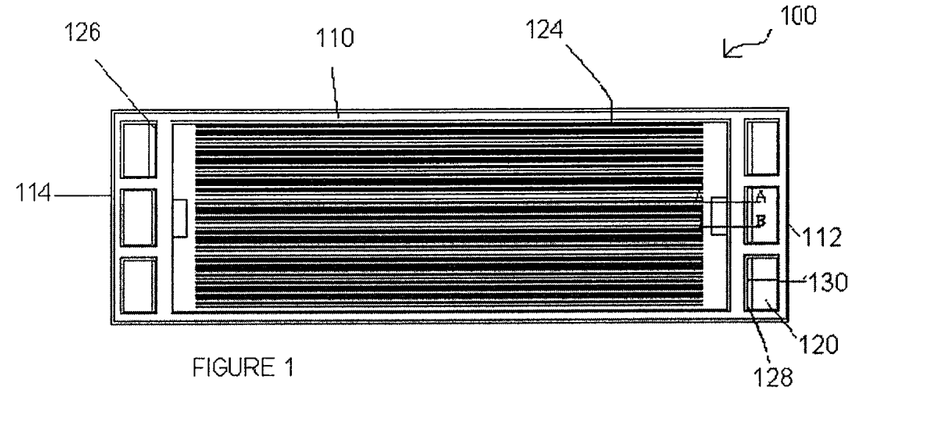
FIG. 1 is a top plan view of a fluid flow field plate with baffle with a constant depth and a constant baffle angle.
Figure 2:
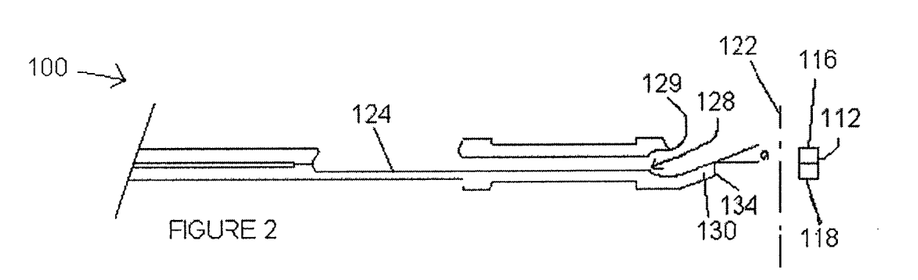
FIG. 2 is a cross-sectional view of the fluid flow field plate illustrated in FIG. 1, taken along lines A-A.
Figure 3:
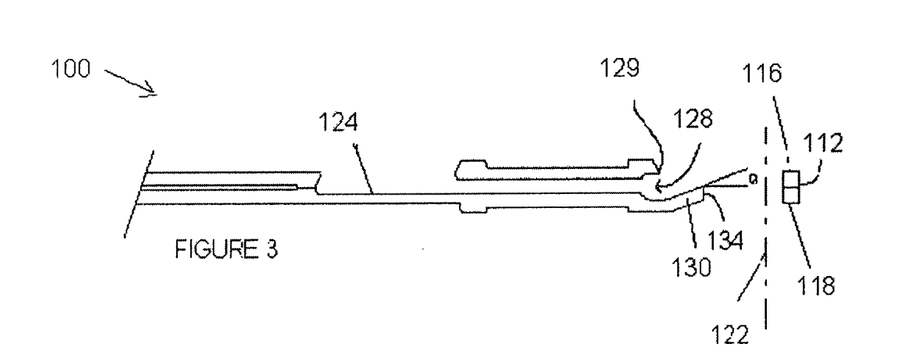
FIG. 3 is a cross-sectional view of the fluid flow field plate illustrated in FIG. 1, taken along lines B-B.

Structure and Relationship of Parts:

Referring to FIG. 1, there is provided a first embodiment of fluid flow field plate for a unit cell with header flow enhancement generally referenced by numeral 100. First embodiment 100 includes a rectangular shaped planar body 110 with a first end 112 and a second end 114. Referring to FIG. 2, planar body 110 also includes a first surface 116 and a second surface 118. Referring to FIG. 1, header openings 120 are provided at first end 112 and second end 114. Header openings 120 extend between first surface 116 and second surface 118 to define a flowpath 122 as illustrated in FIG. 2. Referring to FIG. 1, open flow field channels 124 are provided in each of first surface 116 and in second surface 118. Each flow field channel 124 has an inlet port 126 and an outlet port 128 that are in fluid communication with header openings 120. Each inlet port 126 and outlet port 128 has a first edge 129 and an opposed second edge in the form of a baffle 130 with a remote end 134 which extends into flow path 122. Baffle 130 is illustrated as having a constant depth as shown in FIG. 1. Referring to FIGS. 2 and 3, baffle 130 is positioned at an angle relative to a plane defined by planar body 110. Angle can vary but will be more than 0 degrees and less than 90 degrees relative to the plane defined by planar body 110.

Alternatively, although it is not illustrated, it will be appreciated that baffle 130 could extend along the plane, defined by planar body 110, and then have a remote end 134 that extends at an angle to the plane defined by planar body 110. Angle of remote end 134 could also vary between 0 degrees 90 degrees relative to the plane defined by planar body 110. It will also be appreciated that baffle 130 could be curved relative to the plane defined by planar body 110 and that the curve of baffle 130 could be constant or varied.

The preferred angle of baffle 130 is selected to turn the high velocity flow as much as possible toward the direction of header flowpath 122, without impinging on any adjacent plates.

Any fluid lying between first port edge 129 and remote end 134 of baffle 130 is prevented from forming a continuous blockage across port outlet 128 by the increased distance between the first port edge 129 and remote end 134 of baffle 130. At the discontinuity between first port edge 129 and remote end 134 of baffle 130, fluid will always prefer to remain at the energy state rather than spanning the large gap at port outlet 128.

Referring to FIGS. 4 through 8, there is illustrated a second embodiment of a fluid flow field plate generally referenced by numeral 200. Fluid flow field plate 200 is similar to embodiment 100 except that baffle 230 has a varying depth when it extends into flowpath 222. In the illustrated embodiment, baffle 230 extends on a diagonal from a first wall 236 of header opening 220 to an opposing wall 238.

Figure 4:
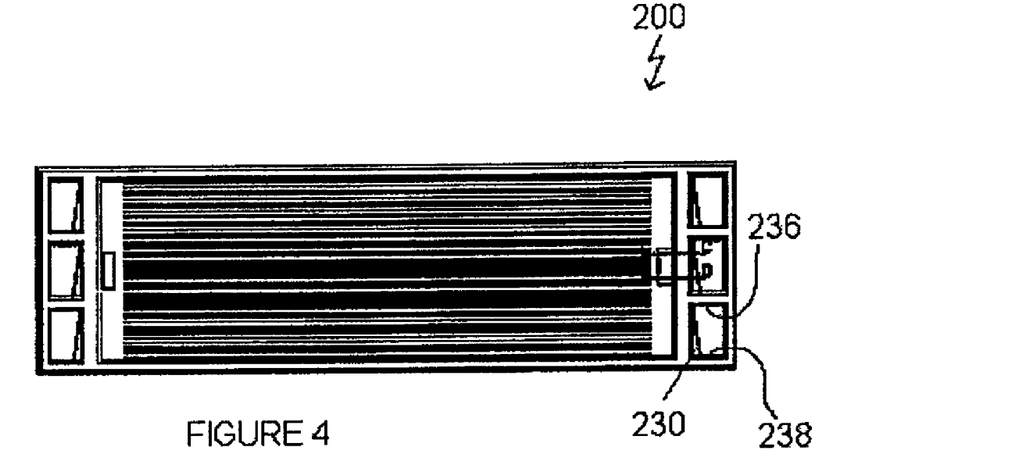
FIG. 4 is a top plan view of a second embodiment of the fluid flow field plate wherein the baffle has a varying depth with a constant angle.
Figure 5:
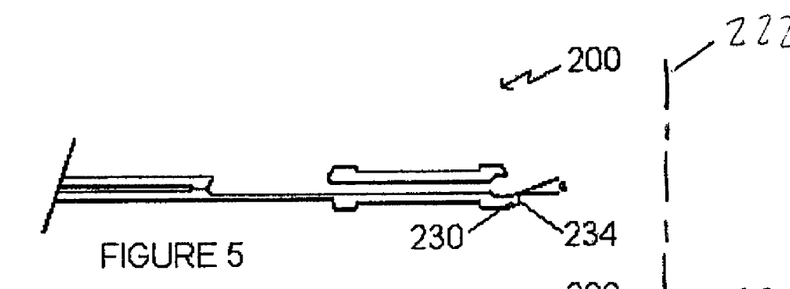
FIG. 5 is a cross-sectional view of the second embodiment of the flow field plate taken along lines C-C.
Figure 6:
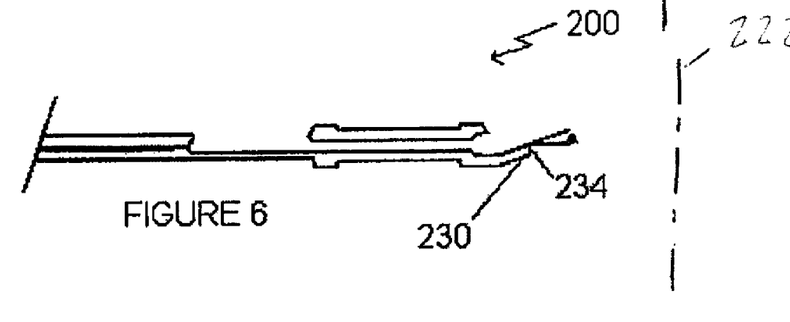
FIG. 6 is a cross-sectional view of the second embodiment taking along lines D-D.

Baffle 230 can be varied smoothly between the first side 236 to opposing side 238 of header opening 220 in order to manipulate the header flow for a number of reasons. Manipulating the header flow can create a velocity/pressure gradient along remote edge 234 of baffle 230 to draw water along it onto one particular header wall or on to a water management feature like a capillary to help preferentially knock out condensate against a cooler wall, or to prepare flow for downstream header bends in a particular direction.

Figure 7:
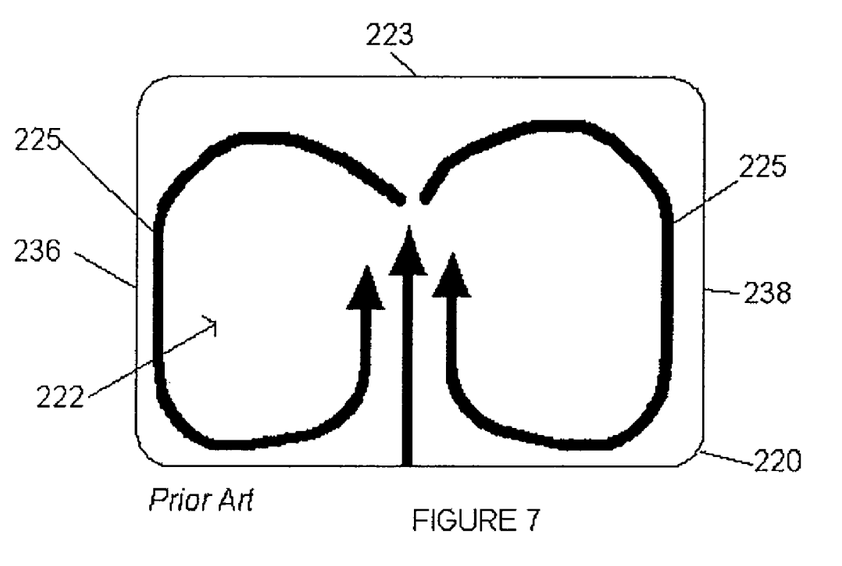
FIG. 7 is detailed cross sectional top plan view of a header opening of the prior art fluid flow field plate showing the flow pattern.
Figure 8:
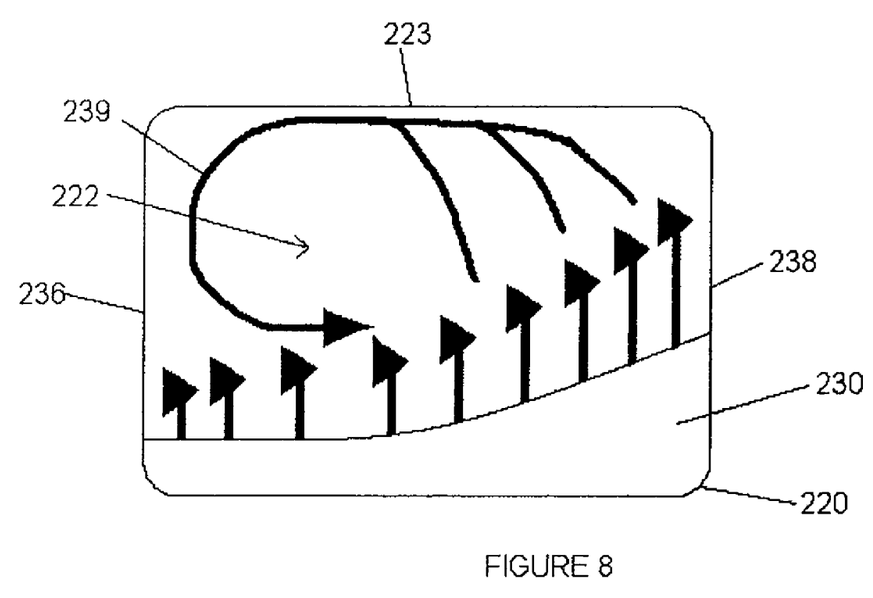
FIG. 8 is detailed cross sectional top plan view of the header opening of the fluid flow field plate illustrated in FIG. 4 showing the flow pattern.
Figure 9:
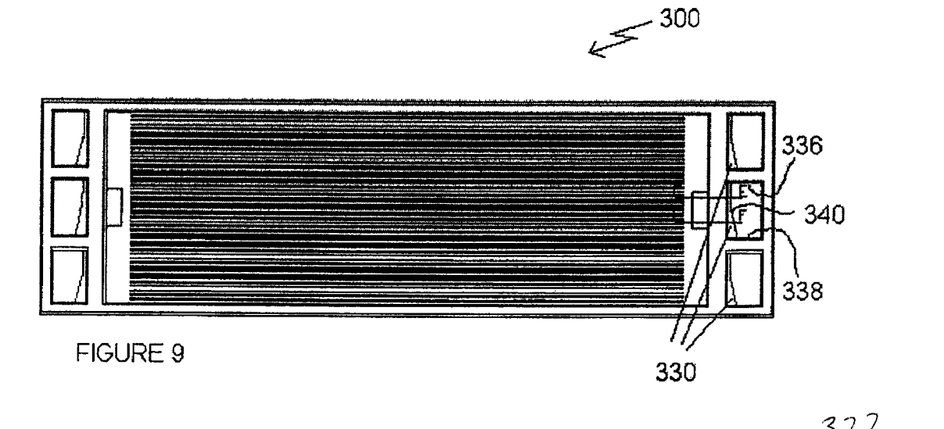
FIG. 9 is a top plan view of a third embodiment of the fluid flow field plate having a baffle with a variable depth and a constant angle.
Figure 10:
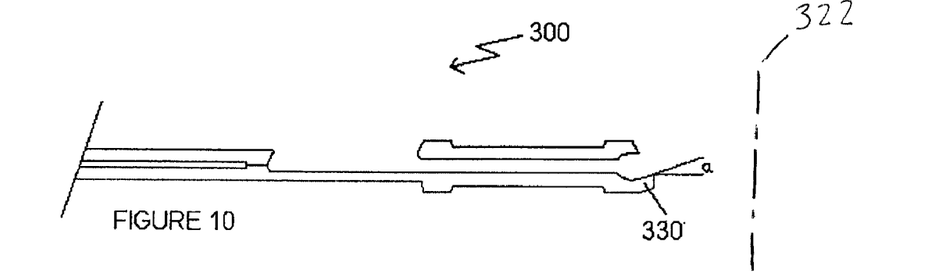
FIG. 10 is a cross-sectional view of the third embodiment taken along lines E-E.
Figure 11:
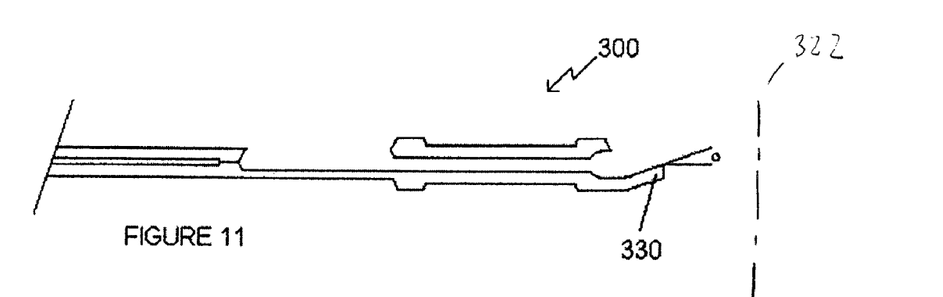
FIG. 11 is a cross-sectional view of the third embodiment taken along lines F-F.

Embodiment 200 can further increase effective header area by inducing a single swirl to the header flow as illustrated in FIGS. 7 and 8. With respect to FIG. 7, identified as PRIOR ART, where no baffle extends into flowpath 222, fluid flow entering header outlet at a high velocity hits an outer wall 223 and forms two vortices as indicated by arrows 225. As the gas impinges into the main flow which is in the header direction, it reduces the amount of cross sectional area through which the main header flow can travel in the header direction thereby reducing the effective header area.

Referring to FIG. 8, where baffle 230 is varied along its length from a shorter depth adjacent first side 236 to a larger depth adjacent the opposing side 238 of header opening 220, header velocity profile will be altered. The result will be higher header direction velocity and lower cell plane velocity at the first side 236 with lower header velocity and higher cell plane velocity at opposed side 238. As illustrated in FIG. 8, this will induce a single vortex as illustrated by arrow 239 into flow in header opening 220. Single large vortex 239 illustrated in FIG. 8 results in a larger effective header flow area than two smaller opposing vortices 225 as shown FIG. 7. This results in an increase in the effective header region with decreased flow resistance at the cell entrance and/or exit, lower propensity for ice blockage on freeze start up, and increased effectiveness of hydrophobic coating it if such a coating applied Referring to FIGS. 9 through 11, there is illustrated a third embodiment of a fluid flow field plate generally referenced by numeral 300. Fluid flow field plate 300 is similar to previously described embodiments except baffle 330 has a varying depth. In the illustrated embodiment, baffle 330 extends into flow path 322 on a diagonal from first side 336 of header opening 320 to a midpoint 340 before continuing at a constant depth to opposing side 338. It will be understood that depth of baffle 330 could be varied anywhere along its length from first side 336 to opposing side 338. It will also be appreciated that baffle 330 could have a concave or convex shape as it extends across header opening 320. It will also be appreciated that baffle could extend along any portion of header opening.

Figure 12:
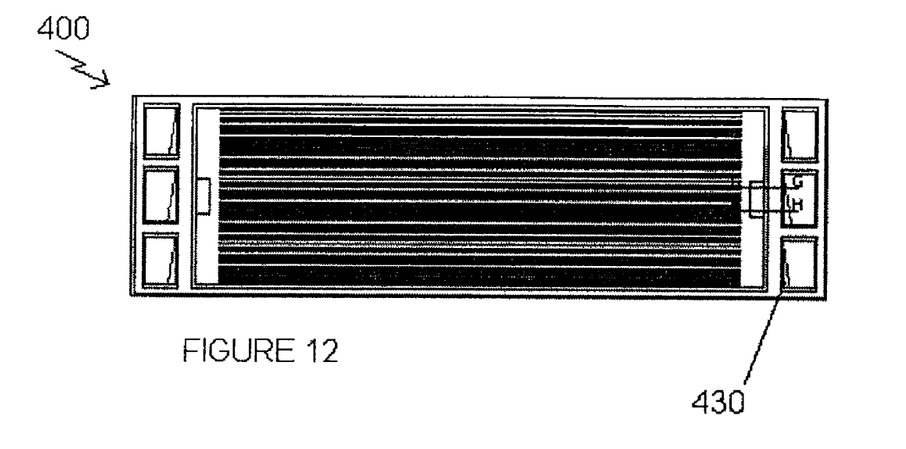
FIG. 12 is a top plan view of a fourth embodiment of the fluid flow field plate having a baffle with varying depth and a varying angle.
Figure 13:
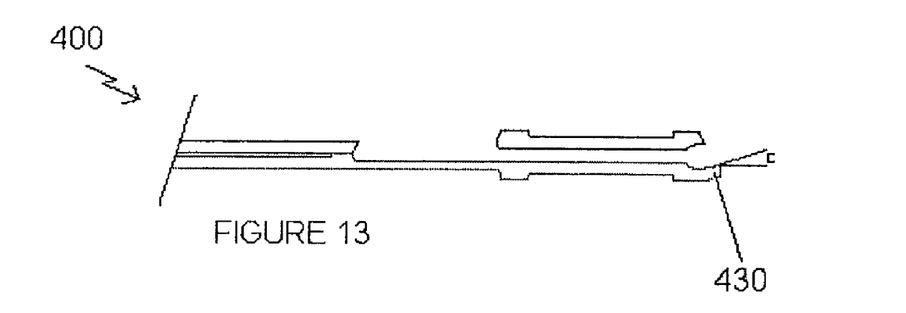
FIG. 13 is a cross-sectional view of the third embodiment taken along lines G-G.
Figure 14:
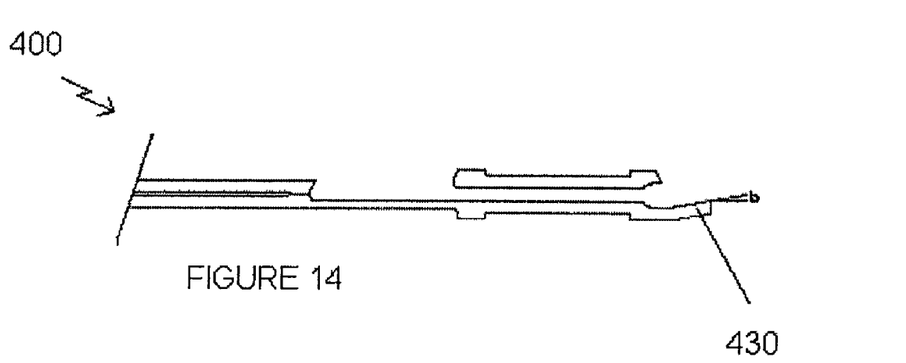
FIG. 14 is a cross-sectional view of the third embodiment taken along lines H-H.
Figure 15:
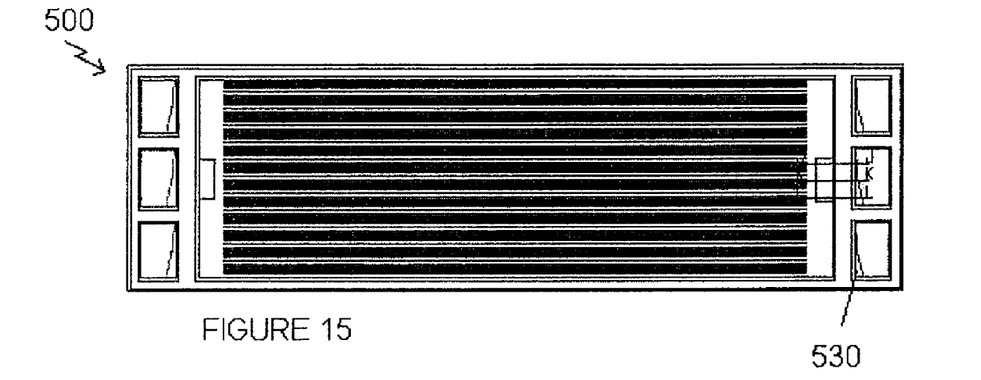
FIG. 15 is a fifth embodiment of the fluid flow field plate having a baffle with a variable depth and a non-linearly varying angle.
Figure 16:
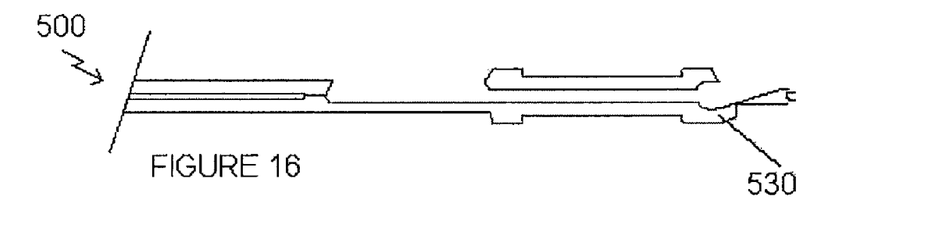
FIG. 16 is a cross-sectional view of the fifth embodiment taken along lines J-J.
Figure 17:
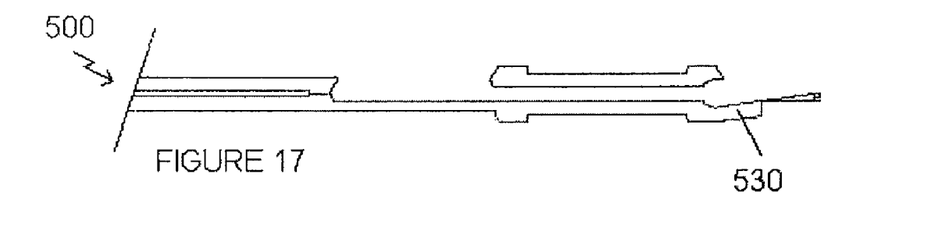
FIG. 17 is a cross-sectional view of the third embodiment taken along lines K-K.
Figure 18:
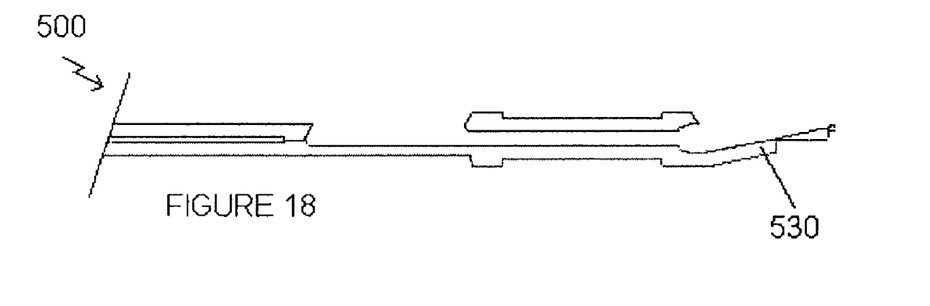
FIG. 18 is a cross-sectional view of the third embodiment taken along lines L-L.

Referring to FIGS. 12 through 14 there is illustrated a fourth embodiment of the fluid flow field plate generally referenced by numeral 400. With fourth embodiment 400, baffle 430 is of a varying depth and a varying angle.

Referring to FIGS. 15 through 18 there is illustrated a fifth embodiment of fluid flow field plate generally referenced by numeral 500. Fifth embodiment 500 includes a baffle 530, which has a variable depth and a non-linearly varying angle.

Furthermore, it will be appreciated that any of the previously described embodiments could provide for a hydrophobic baffle. The surface of baffle provides a large smooth area that can be hydrophobically coated with relative ease. In order to do so, edges of the ports are spaced further apart such that water droplets cannot cling to edges and then join to block duct entrance. This geometry enables hydrophobic coatings to overcome the barrier of having to coat sharp, ragged or cleaned edges.

With respect to the preferred embodiments, plates are metal, however it will be appreciated that they could also be made of graphitic material.

Figure 19:
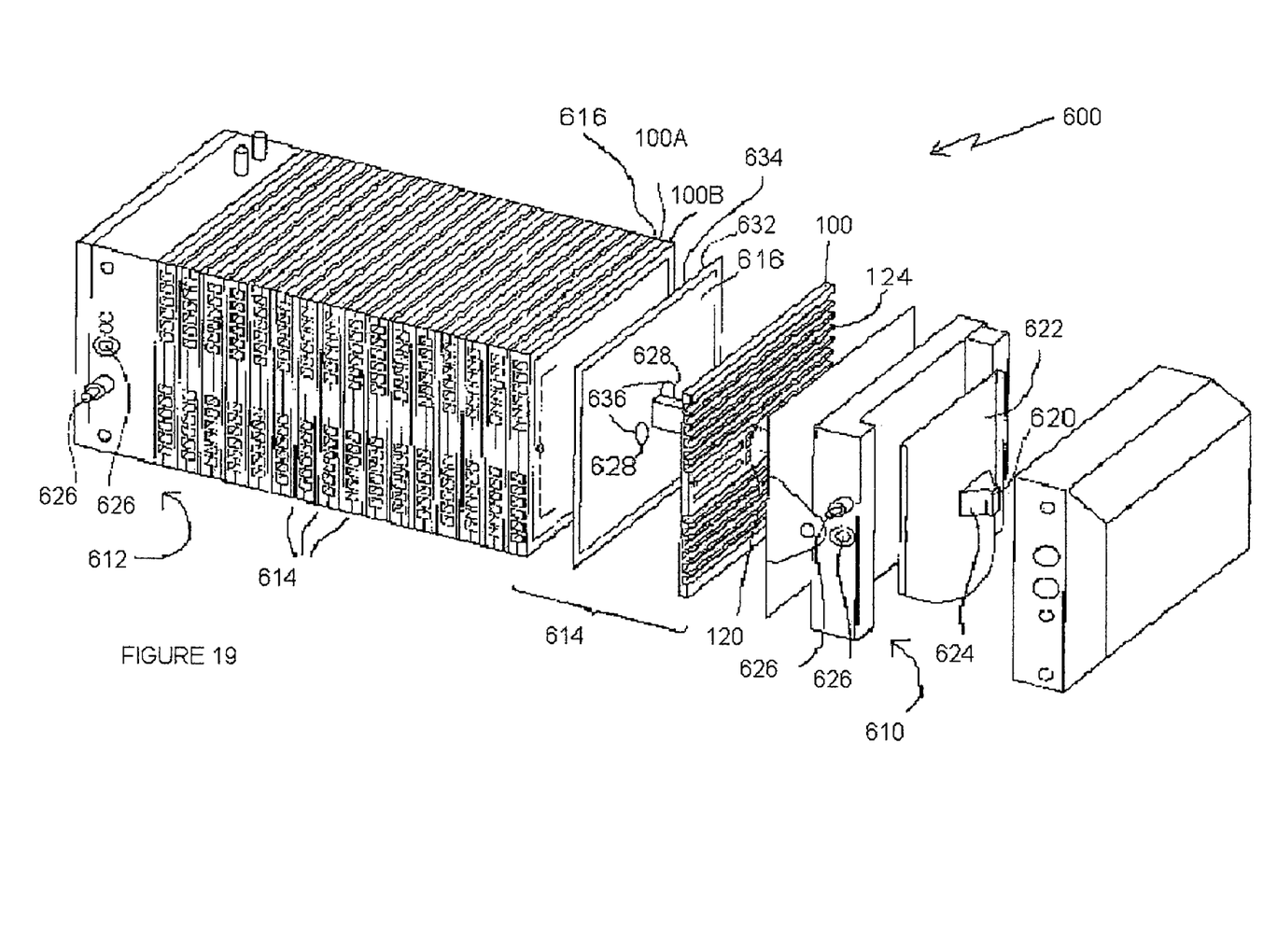
FIG. 19 is a perspective view of an electrochemical fuel cell stack.
Figure 20:
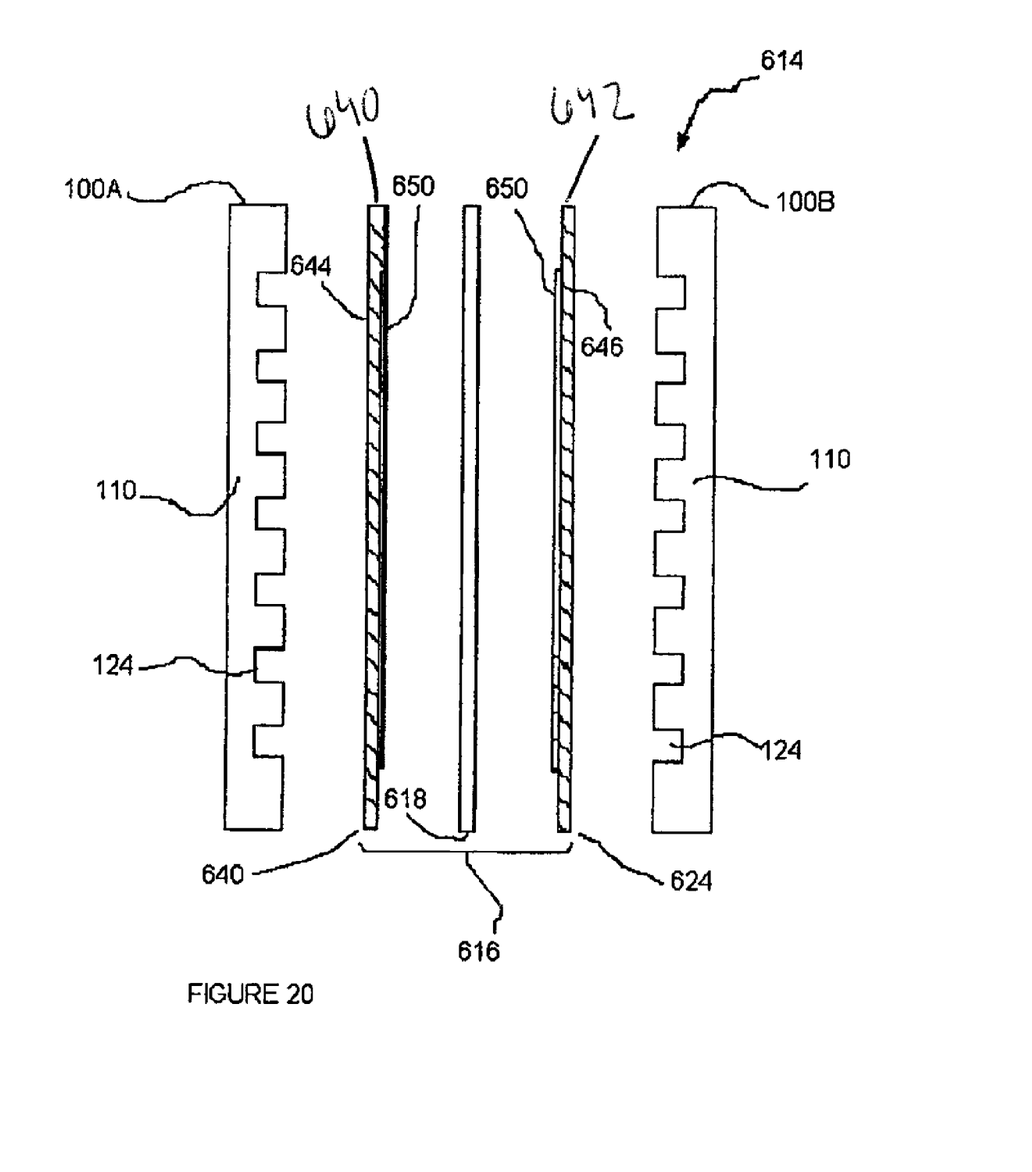
FIG. 20 is an exploded view of an electrode membrane assembly disposed between two fluid flow field plates.

FIG. 19 illustrates a representative electrochemical fuel cell stack 600, which includes a pair of end plate assemblies 610 and 612, and a plurality of stacked fuel cells 614, which incorporate flow field plates 100 illustrated in FIG. 1. Referring to FIG. 20, each of fuel cells 614 include a membrane electrode assembly (MEA) 616 interposed between flow field plates 100.

Referring to FIG. 19, in the illustrated electrochemical fuel cell stack 600, flow field plates 100 have adjoining surfaces. Adjoining pair of flow field plates are represented as an anode flow field plate 100a and a cathode flow field plate 100b. A tension member 620 extends between end plate assemblies 610 and 612 to retain and secure stack 600 in its assembled state. Spring 622 with clamping members 624 grip an end of tension member 620 to apply a compressive force to fuel cells 614 of stack 600.

Fluid reactant streams are supplied to and exhausted from internal header openings 628 and flow passages 640 in stack 600 via inlet and outlet ports 626 in end plate assemblies 610 and 612. Aligned internal reactant header openings 628 in MEAs 616 and header openings 120 in flow field plates 100, form internal reactant headers extending through stack 600.

In illustrated embodiment 600, perimeter seal 632 is provided at the outer edge 634 of both sides of MEA 616. Header seals 636 circumscribe internal reactant header openings 628 on both sides of MEA 616. When stack 600 is secured in its assembled, compressed state, seals 632 and 636 cooperate with the adjacent pair of plates 100 to fluidly isolate fuel and oxidant reactant streams in internal reactant headers and passages, thereby isolating one reactant stream from the other and preventing the streams from leaking from stack 600.

As illustrated in FIG. 19, each MEA 616 is positioned between the active surfaces of two flow field plates 100. As described above, each flow field plate 100 has flow field channels 124 (partially shown) on the active surface thereof (which contact MEA 616) for distributing fuel or oxidant fluid streams to the active area of the contacted electrode of MEA 616. Flow field channels 124 on the active surface of plates 100 are fluidly connected to internal reactant header openings 120 in plate 100 via supply/exhaust passageways comprising backfeed channels 640 (partially shown) located on the non-active surface of flow field plate 100 and ports 128 extending through (i.e., penetrating the thickness) of plate 100.

Referring to FIG. 20, MEA 616 includes a polymer electrolyte membrane 618 interposed between two electrodes namely anode 640 and cathode 642. In conventional fuel cells, anode 640 and cathode 642 each comprise a gas diffusion layer that is a fluid distribution layer of porous electrically conductive sheet material 644 and 646. Each fluid distribution layer has a thin layer of electro catalyst 650 such as platinum black or carbon supported platinum catalyst disposed on the surface there of at the interface with membrane 618 to render each electrode electrochemically active.

FIG. 19 illustrates a representative fuel cell stack 600. With fuel cell stack 600, fuel cells 614 are arranged in series, such that, with respect to a single fuel cell 614, anode flow field plate 100a is adjacent to the cathode flow field plate 100b of one of the two adjacent fuel cells 614 and cathode flow field plate 100b is adjacent to the anode flow field plate 100a of the other adjacent fuel cell 614 (i.e., anode 640 faces the cathode 642 of one adjacent fuel cell 614 and cathode 642 faces anode 640 of other adjacent fuel cell 614). Alternatively, rather than having two flow field plates 100 between adjacent membrane electrode assemblies 616, fuel cell stack 600 may comprise a plurality of bipolar flow field plates (not shown) between adjacent membrane electrode assemblies 616. In such stacks, channels on one side of the bipolar flow field plate function as the anode flow field channels for, and carry fuel to, the anode 640 of one of the adjacent membrane electrode assemblies 616, while channels on the other side of the plate serve as the cathode flow field channels for, and carry oxidant to, the cathode 642 of the other adjacent membrane electrode assembly 616. In both configurations, the flow field plates 100 are electrically conductive and cooperate with electrically conductive fluid distribution layers 644 and 646 to conduct current through fuel cell stack 600.

It will be appreciated that in any of the aforementioned embodiments, baffle can also be provided at the inlet port in addition to, or in the alternative to baffle provide on the outlet port.

While particular steps, elements, embodiments and applications of the present invention have been shown and described, it will be understood, of course, that the invention is not limited thereto since modifications may be made by persons skilled in the art, particularly in light of the foregoing teachings. It is therefore contemplated by the appended claims to cover such modifications as incorporate those steps or elements that come within the spirit and scope of the invention.

What is claimed is:

1. A fluid flow field plate for an electrochemical fuel cell, comprising:
   a planar body having a first surface, a second surface and more than one header opening extending between the first surface and the second surface to define a flow path;
   at least one open flow field channel with an inlet port and an outlet port being provided in the first surface, the outlet port being in fluid communication with one of the more than one header openings; and
   at least one of the outlet port and the inlet port having a baffle extending into the flow path,
   wherein the baffle is formed as a single piece that has at least one of a varying depth in a direction extending into the flow path and a varying angle relative to a plane defined by the planar body.

2. The fluid flow field plate of claim 1 wherein the second surface has at least one fluid header opening and at least one open flow field channel with an inlet port and an outlet port, the outlet port being in fluid communication with the header opening.

3. The fluid flow field plate of claim 1 wherein the baffle is angled at an angle of more than 0 degrees and less than 90 degrees relative to the plane defined by the planar body.

4. The fluid flow field plate of claim 1 wherein the baffle has a remote end that extends at an angle of more than 0 degrees and less than 90 degrees relative to the plane defined by the planar body.

5. The fluid flow field plate of claim 1 wherein the baffle is curved relative to the plane defined by the planar body.

6. The fluid flow field plate of claim 5 wherein the curve of the baffle is variable.

7. The fluid flow field plate of claim 1 wherein the baffle has a constant depth in the direction extending into the flow path.

8. The fluid flow field plate of claim 1 wherein the baffle has a varying depth in the direction extending into the flow path.

9. The fluid flow field plate of claim 1 wherein the baffle is hydrophobic.

10. The fluid flow field plate of claim 1 wherein the planar body is made of metal.

11. The fluid flow field plate of claim 1 wherein the planar body is made of graphitic material.

12. The fluid flow field plate of claim 1 wherein the baffle has a varying angle relative to the plane defined by the planar body.

13. The fluid flow field plate of claim 1 wherein the baffle has a nonlinearly varying angle relative to the plane defined by the planar body.

14. The fluid flow field plate of claim 1 wherein the baffle has a varying depth in the direction extending into the flow path and a varying angle relative to the plane defined by the planar body.

15. The fluid flow field plate of claim 1 wherein the baffle is configured such that a single vortex is formed in a region near the baffle by fluid flow entering the flow path.

16. An electrochemical fuel cell comprising:
    an anode electrocatalyst layer;
    a cathode electrocatalyst layer;
    a polymer electrolyte membrane interposed between the anode and cathode electrocatalyst layers;
    an anode flow field plate;
    a cathode flow field plate;
    an anode fluid distribution layer interposed between the anode flow field plate and the anode electrocatalyst layer; and
    a cathode fluid distribution layer interposed between the cathode flow field plate and the cathode electrocatalyst layer; wherein:
    each of the anode flow field plate and the cathode flow field plate comprises a planar body having a first surface, a second surface and more than one header opening extending between the first surface and the second surface to define a flow path,
    at least one open flow field channel with an inlet port and an outlet port is provided in the first surface,
    the outlet port is in fluid communication with one of the more than one header openings,
    at least one of the outlet port and the inlet port has a baffle extending into the flow path, and
    the baffle is formed as a single piece that has at least one of a varying depth in a direction extending into the flow path and a varying angle relative to a plane defined by the planar body.

17. An electrochemical fuel cell stack comprising a plurality of fuel cells of claim 16.

* * * * *